(12) United States Patent
Lind et al.

(10) Patent No.: US 12,603,460 B2
(45) Date of Patent: Apr. 14, 2026

(54) QUICK RELEASE SAFETY ASSEMBLY FOR AIR AND ELECTRICAL CONNECTIONS

(71) Applicants: Zachary Lind, La Habra, CA (US); Gary Carl Parsons, La Habra, CA (US)

(72) Inventors: Zachary Lind, La Habra, CA (US); Gary Carl Parsons, La Habra, CA (US)

( * ) Notice: Subject to any disclaimer, the term of this patent is extended or adjusted under 35 U.S.C. 154(b) by 458 days.

(21) Appl. No.: 18/111,419

(22) Filed: Feb. 17, 2023

(65) Prior Publication Data

US 2023/0283010 A1 Sep. 7, 2023

Related U.S. Application Data

(60) Provisional application No. 63/311,531, filed on Feb. 18, 2022.

(51) Int. Cl.
*H01R 13/62* (2006.01)
*F16L 23/18* (2006.01)
*F16L 37/00* (2006.01)

(52) U.S. Cl.
CPC .......... *H01R 13/6205* (2013.01); *F16L 23/18* (2013.01); *F16L 37/004* (2013.01)

(58) Field of Classification Search
CPC ..... H01R 13/6205; F16L 23/18; F16L 37/004
See application file for complete search history.

(56) References Cited

U.S. PATENT DOCUMENTS

| | | | | |
|---|---|---|---|---|
| 3,181,895 | A * | 5/1965 | Cator | F16L 37/004 285/1 |
| 7,793,987 | B1 * | 9/2010 | Busch | A61M 16/161 285/9.1 |
| 9,279,527 | B2 * | 3/2016 | Davis | B65D 43/0202 |
| 9,647,386 | B2 * | 5/2017 | Andrus | A61M 60/878 |
| D853,658 | S | 7/2019 | Bowles | |
| 10,357,073 | B1 | 7/2019 | Stahl | |
| D870,998 | S | 12/2019 | Bowles | |
| D870,999 | S | 12/2019 | Bowles | |
| D871,698 | S | 12/2019 | Bowles | |
| D871,699 | S | 12/2019 | Bowles | |
| 10,492,552 | B2 | 12/2019 | Jaeger | |
| 10,502,351 | B2 | 12/2019 | Jaeger | |
| 10,633,783 | B1 * | 4/2020 | Kelley | D06F 58/20 |
| 10,658,793 | B2 * | 5/2020 | Blake | G06F 1/18 |
| 10,969,042 | B2 * | 4/2021 | Cuber | F16L 37/004 |
| 11,137,098 | B2 | 10/2021 | Jaeger | |

(Continued)

*Primary Examiner* — Thanh Tam T Le
(74) *Attorney, Agent, or Firm* — Gary L. Eastman, Esq.; Eastman IP

(57) ABSTRACT

A two-piece quick release safety assembly has a circular array of magnetic elements which cooperate together to easily align and securely connect a vehicle air and electrical connection to a helmet. The assembly includes a hose side magnetic connector and a corresponding helmet side magnetic connector that have equal magnetic strength with opposite polarity, such that each north pole and each south pole align to securely maintain the two pieces together. By placing the magnets in a specific arrangement, when the two pieces are proximate to the other, the natural magnetic attraction draws the pieces together in a proper alignment every time without the need to for careful alignment to create a precise connection.

5 Claims, 13 Drawing Sheets

(56)          References Cited

U.S. PATENT DOCUMENTS

| | | | |
|---|---|---|---|
| 11,157,734 | B1 | 10/2021 | Lipchin |
| 11,165,196 | B2 * | 11/2021 | Yonnet ................. H01R 13/631 |
| 11,339,904 | B2 * | 5/2022 | Ghodrati ............... F16L 37/004 |
| 11,462,855 | B2 * | 10/2022 | Doll .................... H01R 13/6205 |
| 11,549,625 | B2 * | 1/2023 | Zoe ........................ F16L 37/004 |
| 12,025,038 | B2 * | 7/2024 | Haynam ............... B08B 15/002 |
| 12,220,188 | B2 * | 2/2025 | Kadshai ............... B25J 15/0416 |
| 2018/0035787 | A1 | 2/2018 | Jaeger |
| 2018/0035788 | A1 | 2/2018 | Jaeger |
| 2018/0035789 | A1 | 2/2018 | Jaeger |
| 2018/0035790 | A1 | 2/2018 | Jaeger |
| 2018/0035791 | A1 | 2/2018 | Jaeger |
| 2018/0038374 | A1 | 2/2018 | Jaeger |
| 2018/0038534 | A1 | 2/2018 | Jaeger |
| 2018/0042366 | A1 | 2/2018 | Jaeger |
| 2018/0066779 | A1 | 3/2018 | Jaeger |
| 2018/0067504 | A1 | 3/2018 | Jaeger |
| 2018/0192724 | A1 | 7/2018 | Jaeger |
| 2018/0193676 | A1 | 7/2018 | Jaeger |
| 2018/0193677 | A1 | 7/2018 | Jaeger |
| 2018/0195654 | A1 | 7/2018 | Jaeger |
| 2019/0223534 | A1 | 7/2019 | Stahl |
| 2020/0100552 | A1 | 4/2020 | Jaeger |
| 2020/0352270 | A1 | 11/2020 | Stahl |

* cited by examiner

QUICK RELEASE SAFETY ASSEMBLY FOR AIR AND ELECTRICAL CONNECTIONS

RELATED APPLICATION

This application claims priority to U.S. Provisional Patent Application Ser. No. 63/311,531 for a "Quick Release Safety Assembly for Air and Electrical Connections," filed Feb. 18, 2022, and currently co-pending, the entirety of which is incorporated herein by reference.

FIELD OF THE INVENTION

The present invention relates generally to offroad headgear systems. The present invention is more particularly directed to a quick release communication and air interface utilizing magnets to maintain connector alignment and attachment, and perhaps most useful as a quick release safety device during use of an offroad vehicle.

BACKGROUND OF THE INVENTION

As the popularity of driving vehicles on dirt, sand and unpaved roads increases, there is a corresponding increase in the need for state of the art protective equipment is a valid concern. In the off-roading sport, high performance vehicles that are often stripped of doors and other standard road safety parts, and then used to speed, jump ramps, and do tricks offroad. Despite the removal of many traditional safety features, the helmet is always worn by the driver and passengers. The helmet often includes a face shield and provides protection from flying sand, rock and brush, and minimizes the risk of blunt force trauma to the head.

A problem exists, however in the off-roading industry. The sport occurs in very dusty and dirty environments where there is poor air quality due to airborne particulate matter. One of the biggest challenges in the sport is that the driver must continually deal with breathing sand or dust while driving. The current solution is to run filtered and pressurized breathable air through a hose to the helmet to provide clean air to the driver and passengers. However, the current solution has some drawbacks. One of the most notable drawbacks occurs when there is a need for quick helmet removal, such as in the event of an emergency exit. Time is of the essence in an emergency situation, such as when the vehicle enters a body of water and becomes submerged, catches fire, or overturns. In these circumstances, it is imperative that the driver and passengers be able to quickly disconnect from the fresh air supply and exit the vehicle. However, currently available air supply systems include an air supply hose that is formed with to slide over barbs/retention ridges that lock the corresponding barbed inlet, providing a pressure fit onto an inlet, on the helmet. Unfortunately, the need to disengage an air supply hose in an emergency takes considerable time and concentration—both of which are not present in a true life-or-death situation. Separating a pressure-fit connection is no easier as the fit must be sufficiently secure to remain connected during even the most aggressive off-road activities. Moreover, even attempting to break or cut the air supply hose in an emergency does not guarantee a speedy exit given that the hoses are durable, often reinforced, and intended to survive the abuses of rugged off-road environment.

In addition to the use of a fresh breathable air supply system, many off-road vehicles are loud, operate alongside other off-road vehicles which are likewise loud, and as a result many off road vehicles are equipped with intercom and radio communication systems that allow drivers to speak with their passengers, and for one off-road vehicle to communicate with another vehicle. Often, the microphone and earphones are mounted within a helmet, and the helmet is tethered to the vehicle-mounted communication system or radio with an electrical connection often consisting of a rugged and durable plug set. Just like the challenges that arise in an emergency where every second counts, the disconnection of a rugged and durable communication plug set only increases the time required to exit the vehicle.

SUMMARY OF THE INVENTION

In light of the above it would be advantageous to provide a helmet solution that provides for the rapid connection and disconnection of a breathable air source and intercom interface to a helmet. The present invention provides a system that rapidly connects a helmet with fresh air and intercom electrical connections. More specifically, the present invention includes a two-piece connector assembly equipped with a circular array of magnetic elements which cooperate together to easily align and securely connect a vehicle air and electrical connection to a helmet. The assembly includes a hose side magnetic connector and a corresponding helmet side magnetic connector that have equal magnetic strength with opposite polarity, such that each north pole and each south pole align to securely maintain the two pieces together. By placing the magnets in a specific arrangement, when the two pieces are proximate to the other, the natural magnetic attraction draws the pieces together in a proper alignment every time without the need to for careful alignment to create a precise connection. This auto-alignment allows for precise alignment on every connection and eliminates any user error that otherwise results in poor connections, air loss, entry of dust or debris, or an intermittent or poor electrical connection. Once the connection is made between the two pieces of the connector, the helmet is provided a continuous breathable air source and a constant and reliable electrical connection. In the even that there is an emergency requiring the passengers to exit the vehicle quickly, the two pieces of the connector assembly may simply be pulled apart with a force to overcome the magnetic attraction to quickly disconnect and exit the vehicle. By utilizing this quick release assembly, the driver and passengers have clean air and reliable electrical connections, with the added benefit of a safer, more secure, and more readily disconnectable helmet.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figures 12, 13:
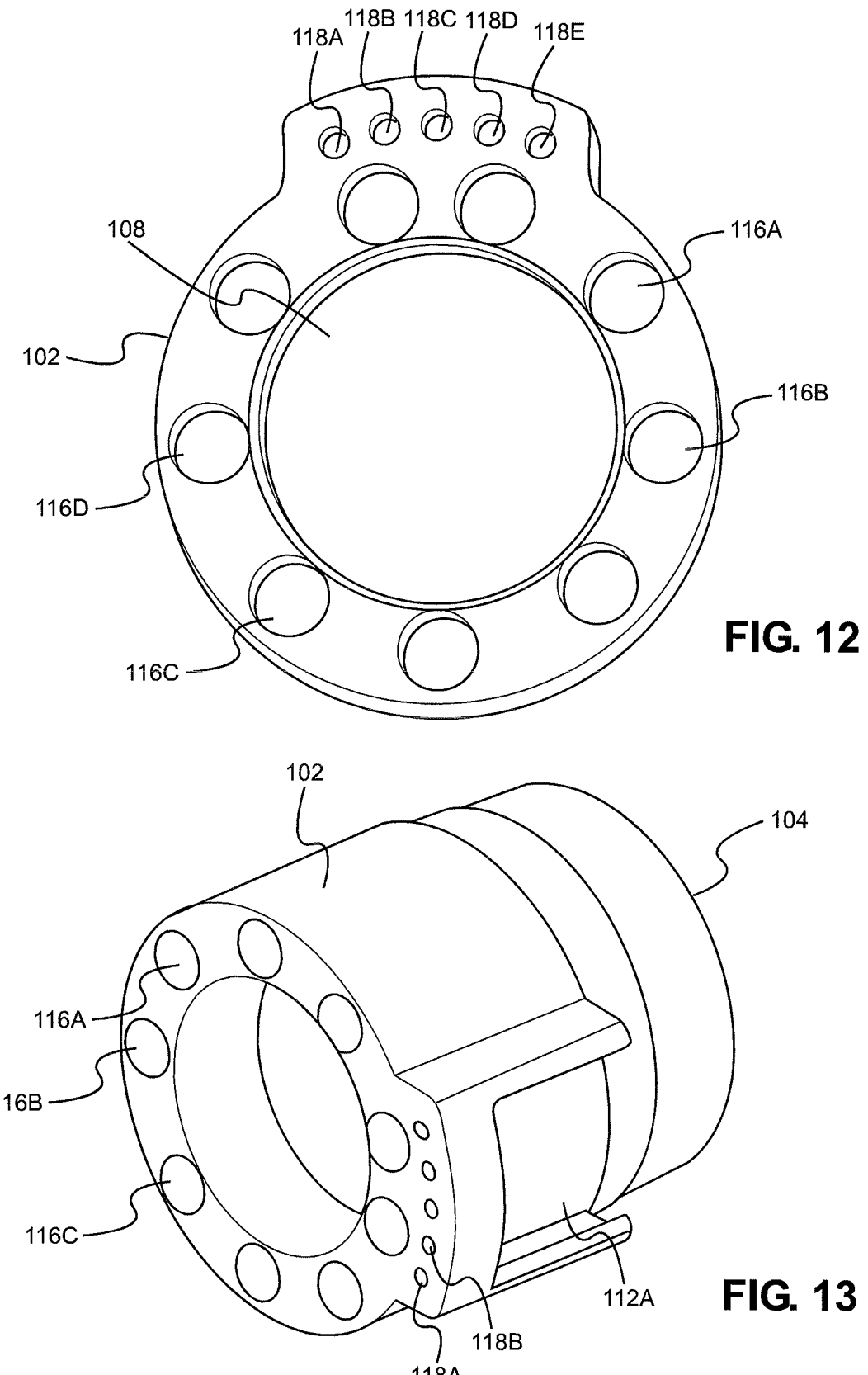
Figures 14, 15, 16:
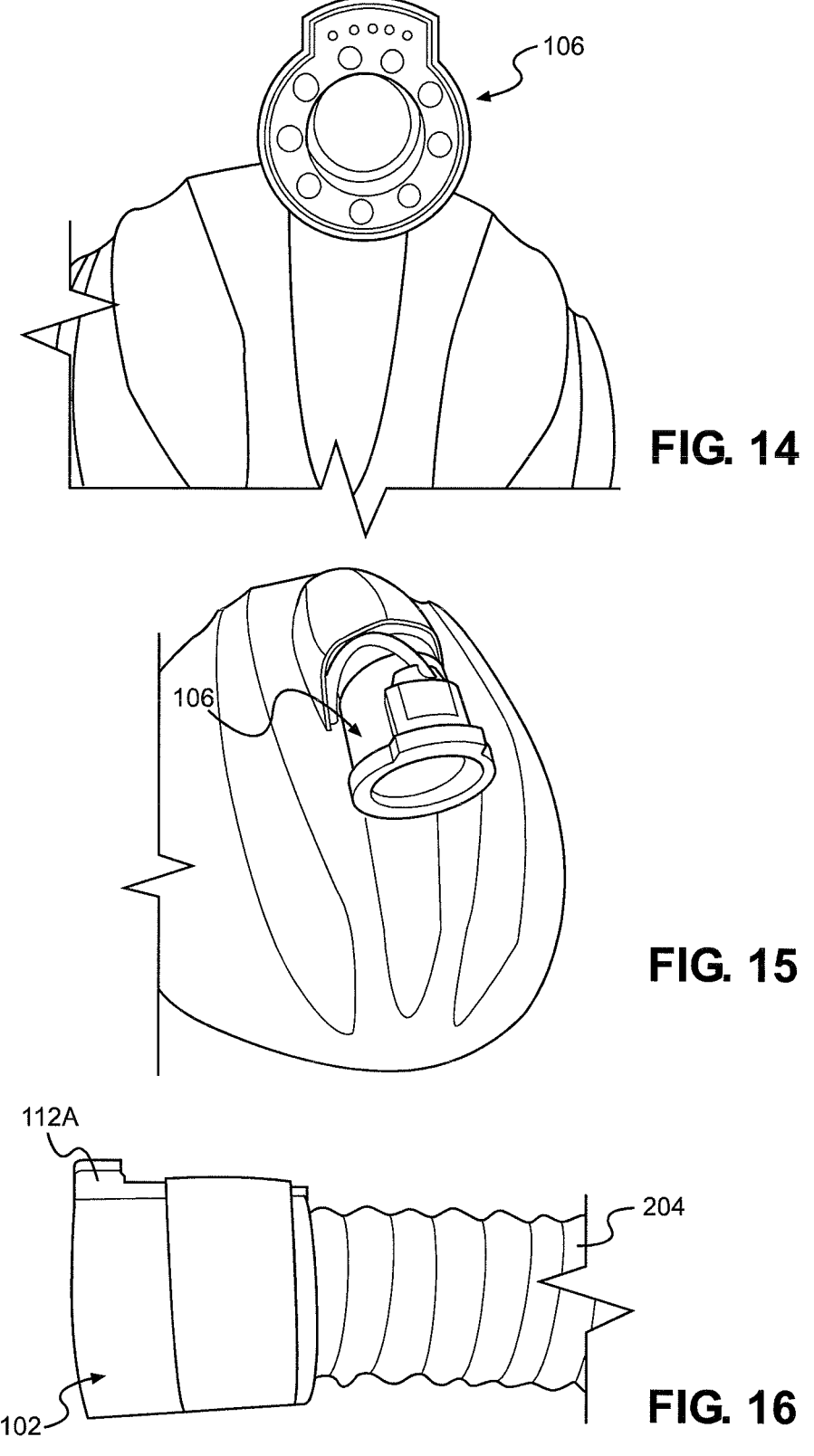
Figure 17:
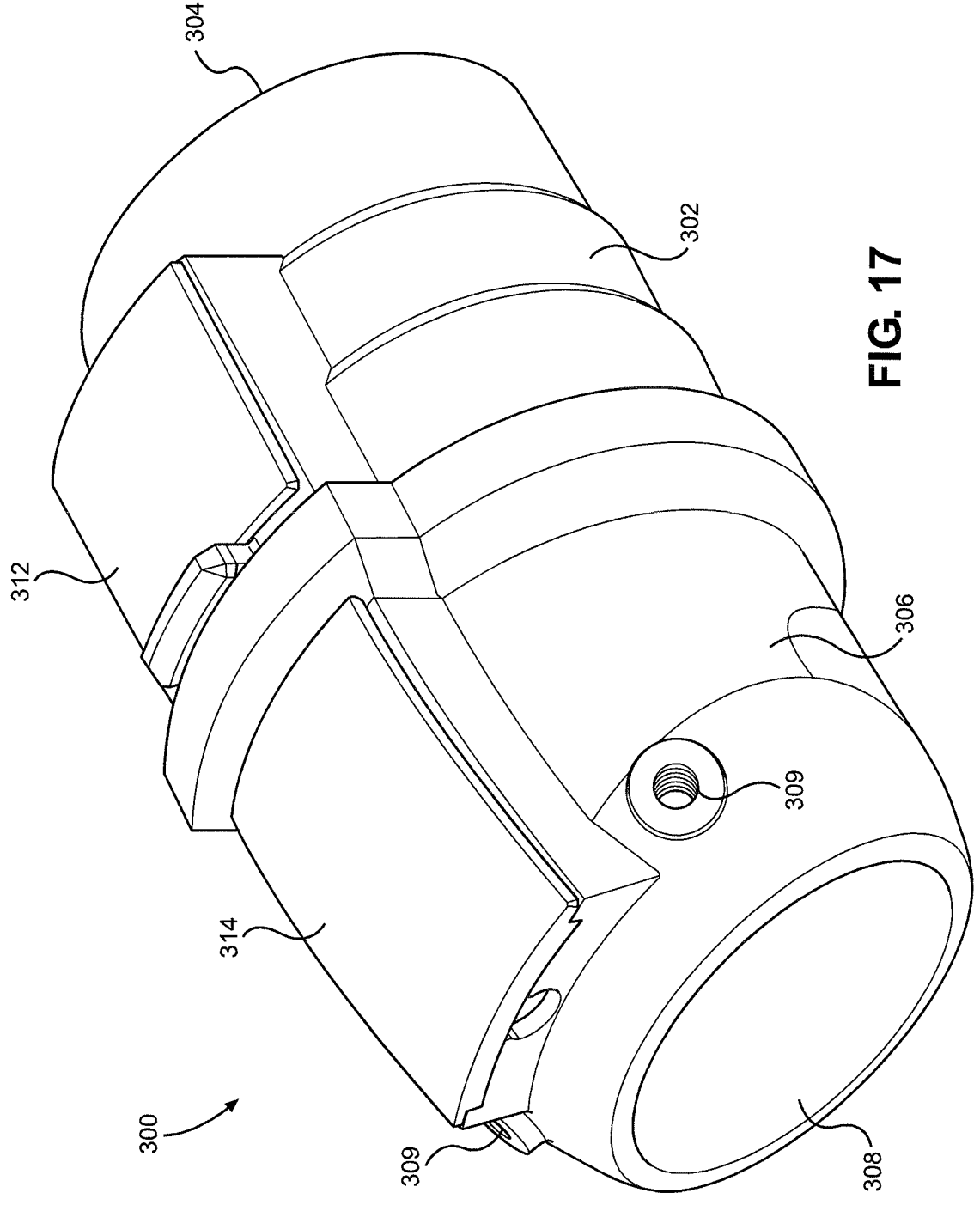
Figure 18:
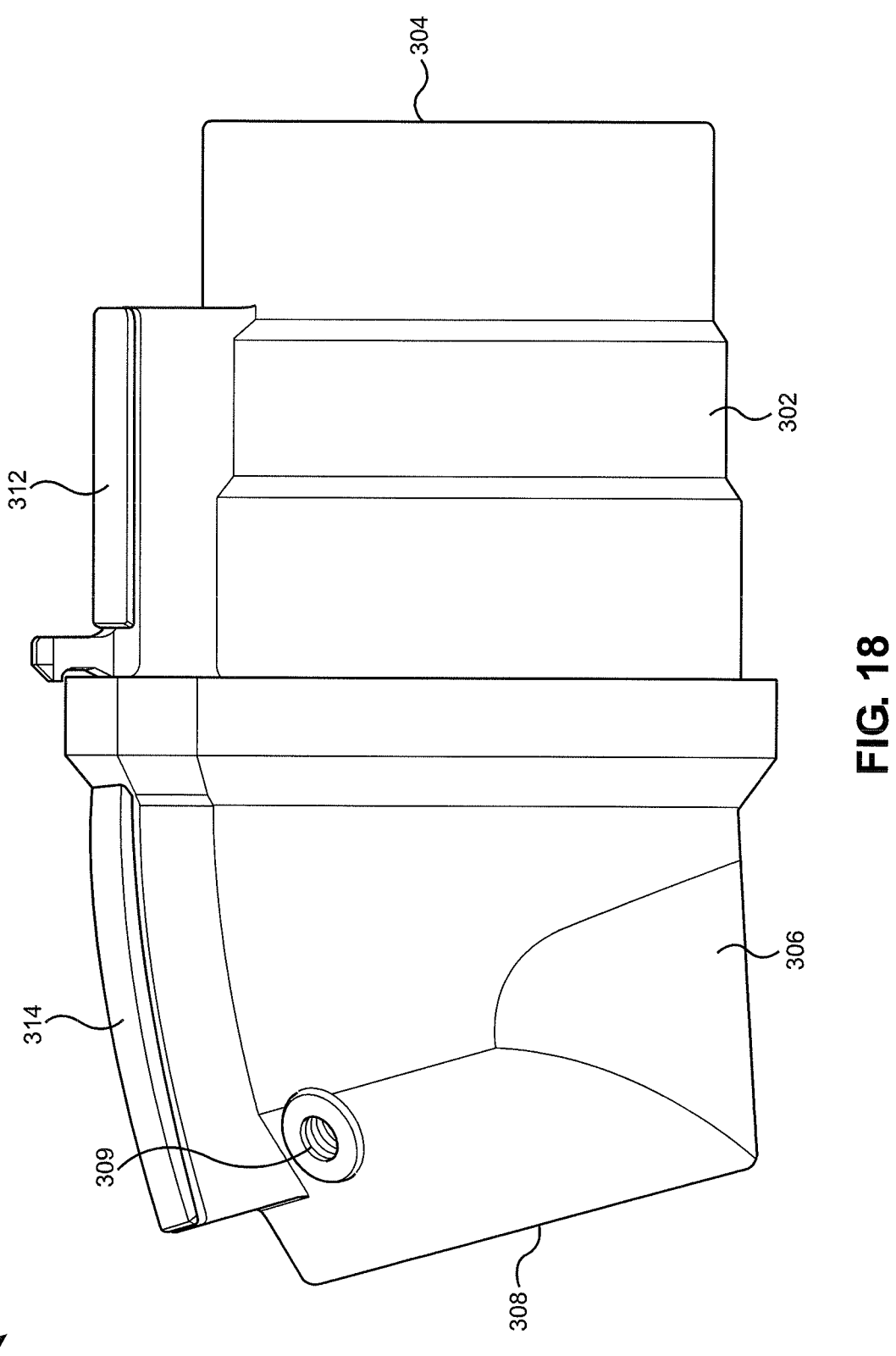
Figure 19:
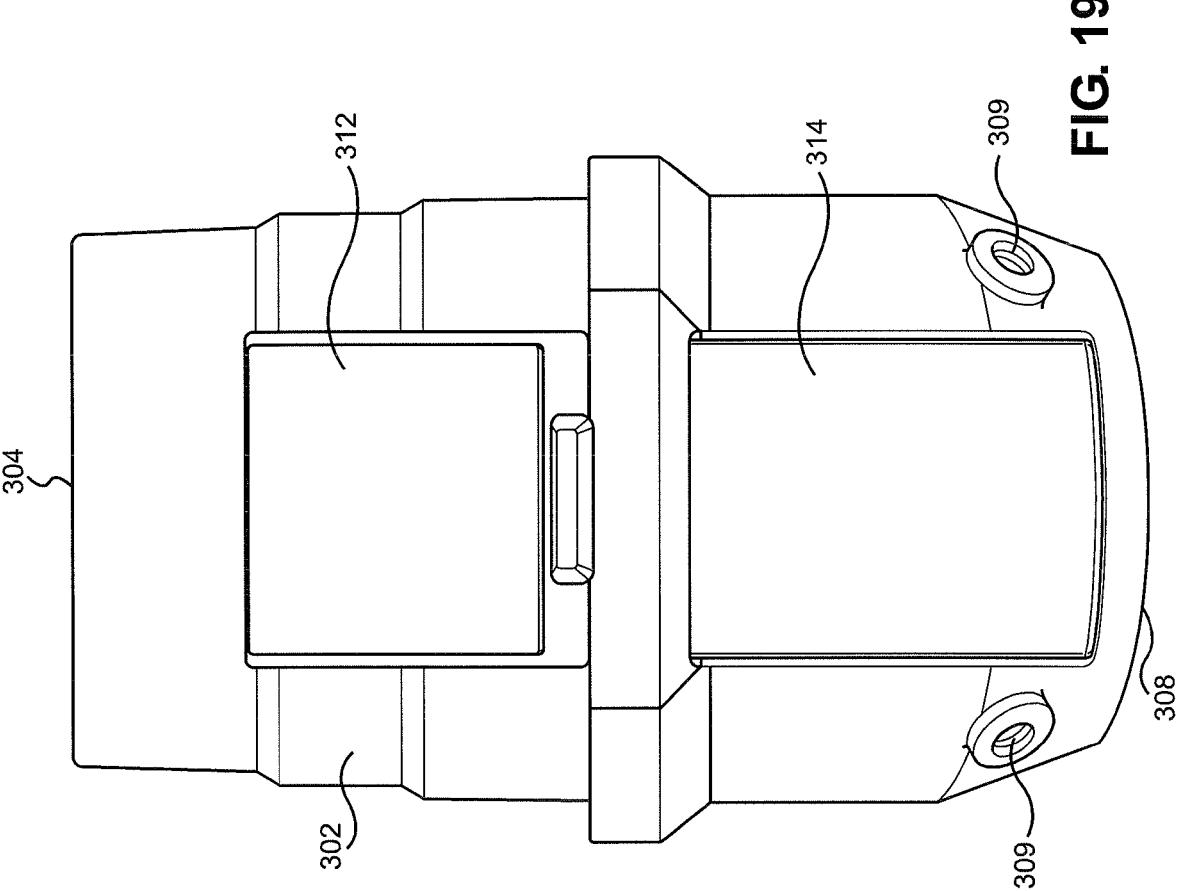
Figure 19:
Figure 20:
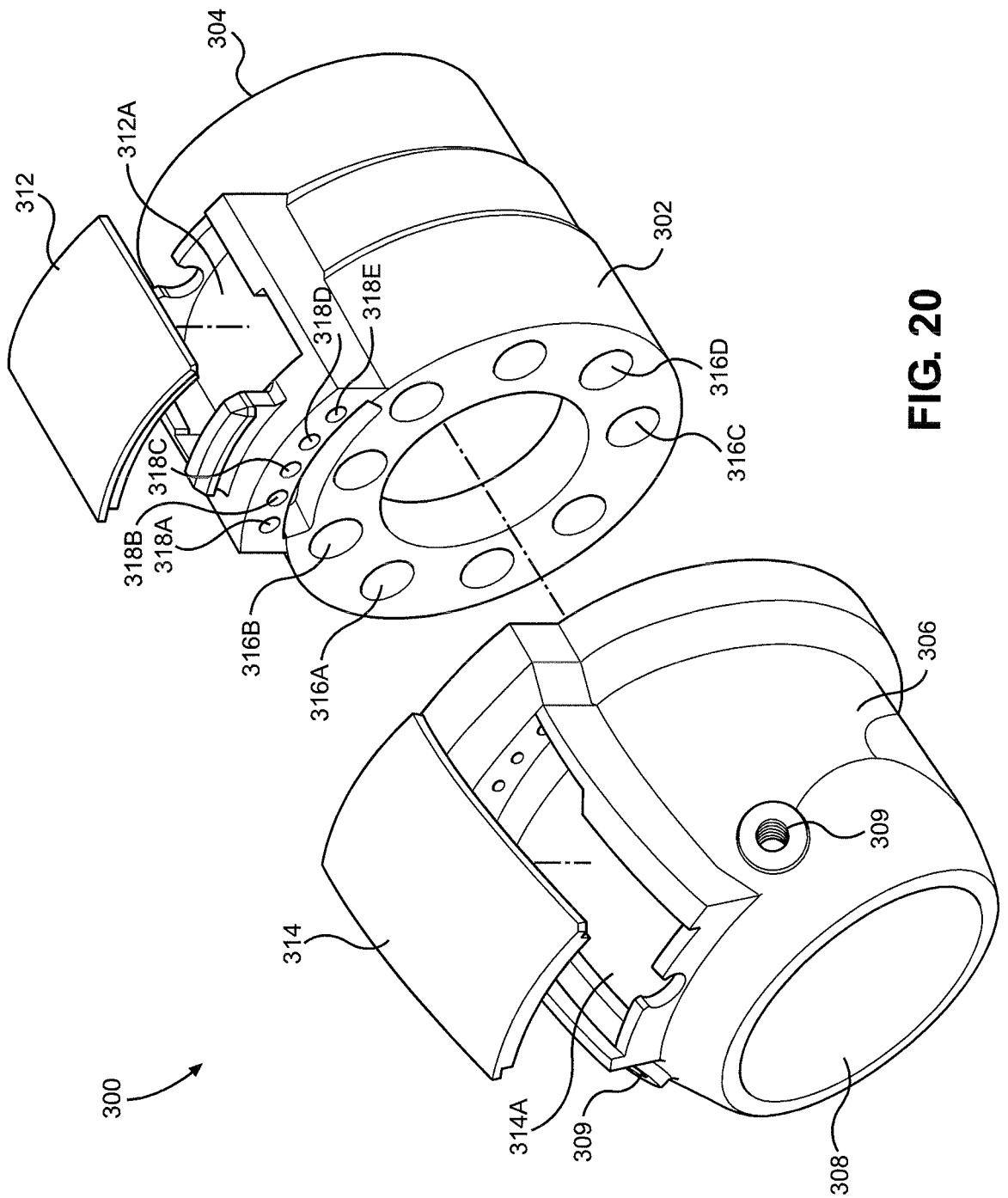
Figure 21:
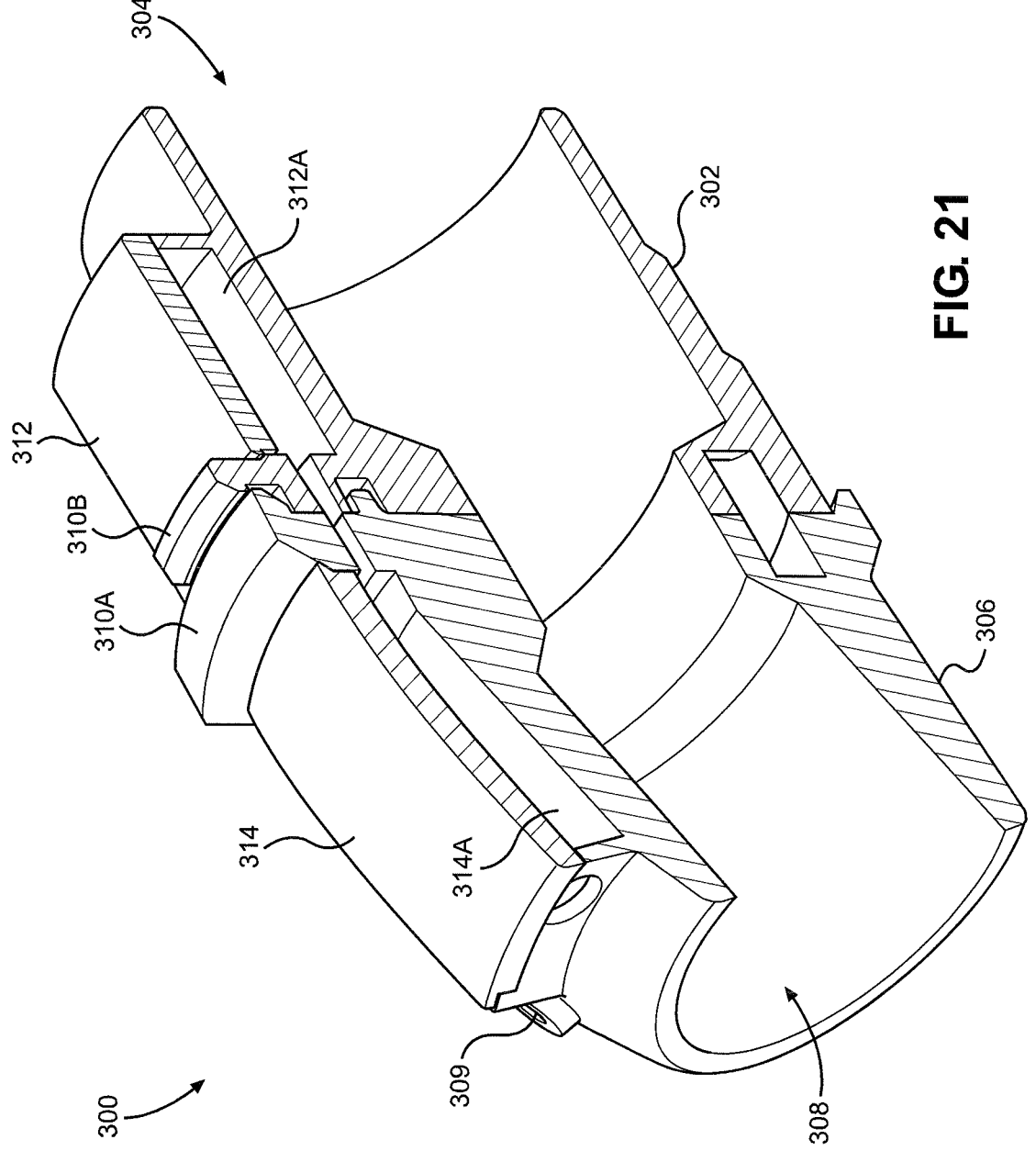
Figure 22:
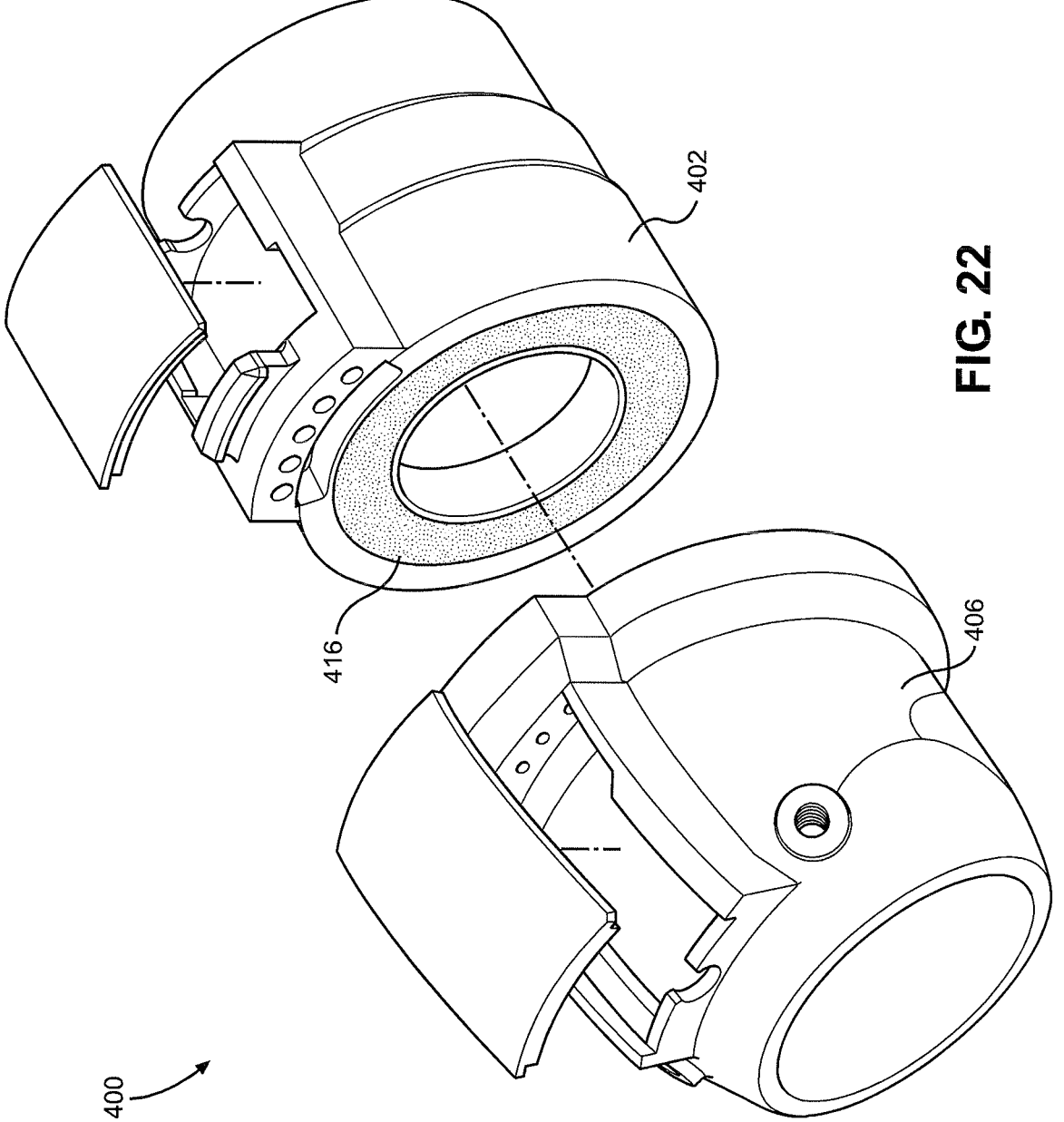

The magnets in their specified arrangement and the channel for electrical reception are seen here. This view shows what the helmet half of the Quick Release Assembly looks like by itself without a helmet attached;

FIG. 12 is a front view of the vehicle half of the Quick Release Assembly showing the magnets, the channel for electrical reception, and the air outlet of the vehicle half;

FIG. 13 is a front side perspective view of the air outlet of the vehicle half of the Quick Release Assembly showing the magnets in their specified arrangement and the channel for electrical reception (marked with a dotted line) in which the female connector cups, or sleeves, can be seen in position to contact the corresponding connector pins from the helmet half of the Quick Release Assembly;

FIG. 14 is an illustration of the rear of the helmet showing the face of the helmet half of the Quick Release Assembly in its top-mounting hose variation attached to a standard race helmet and clearly showing the circular array of magnetic elements intended to align and connect the helmet half and vehicle half of the Quick Release Assembly establishing an air duct from the vehicle to the helmet, and the communication system to the helmet communication system;

FIG. 15 is an illustration of the top view of the helmet half of the Quick Release Assembly in its top-mounting hose variation attached to a standard race helmet and showing the electrical output from the helmet half of the Quick Release Assembly leading to the helmet mounted communication system;

FIG. 16 is an illustration of the side view of the vehicle half of the Quick Release Assembly attached to a standard air hose and electrical communications cable;

FIG. 17 is side perspective view of another preferred embodiment of the Quick Release Assembly of the present invention in which the helmet half of the assembly and the vehicle half of the assembly are connected to form the magnetically aligned interface and showing the channel for electrical reception and the air outlet of the helmet half of the assembly without a hose/helmet attached;

FIG. 18 is a side view of the Quick Release Assembly of FIG. 17;

FIG. 19 is a top view of the Quick Release Assembly of FIG. 17;

FIG. 20 is a side perspective view of the Quick Release Assembly of FIG. 17 in which the helmet half of the assembly and the vehicle half of the assembly are disconnected to show the magnetically aligned interface and the channel for electrical connection, the air outlet of the helmet half, and the magnets and channel cups of the vehicle half of the assembly without a hose/helmet attached;

FIG. 21 is a cut-away view of the Quick Release Assembly of FIG. 17 in its connected configuration; and FIG. 22 is a side perspective view of an alternate preferred embodiment of the Quick Release Assembly of the present invention in a disconnected configuration showing the magnetically aligned interface having a ring magnet.

DETAILED DESCRIPTION

Figure 1:
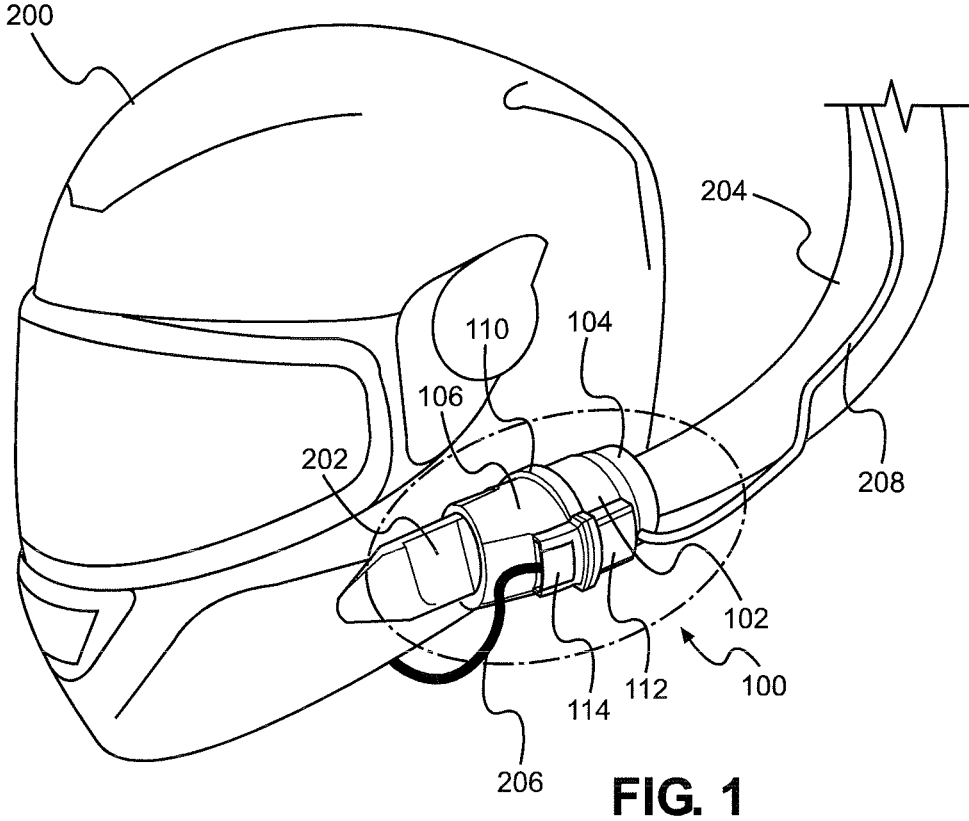
FIG. 1 is a side view of the Quick Release Assembly attached to a standard race helmet and a standard air and electrical communications hose with a hose/helmet attached.

Referring initially to FIG. 1, a side view of the Quick Release Assembly of the present invention is shown on helmet 200 and generally designated 100. Quick Release Assembly 100 includes a two part assembly having a vehicle half 102 that interfaces to a vehicle air supply hose 204, and a helmet half 106 that interfaces to a helmet air inlet 202. An electrical connection is formed between vehicle communication plug 112 that interfaces with a vehicle communication device through cable 208, and a helmet communication plug 114 that interfaces to a helmet communication device through cable 206. The two halves 102 and 106 join together using a magnetic assembly that is further discussed below, and are sealed by sealing ring 110 that prevents the introduction of dust and dirt and seals the air flow from the vehicle air supply hose 204 to helmet air inlet 202.

Figure 2:
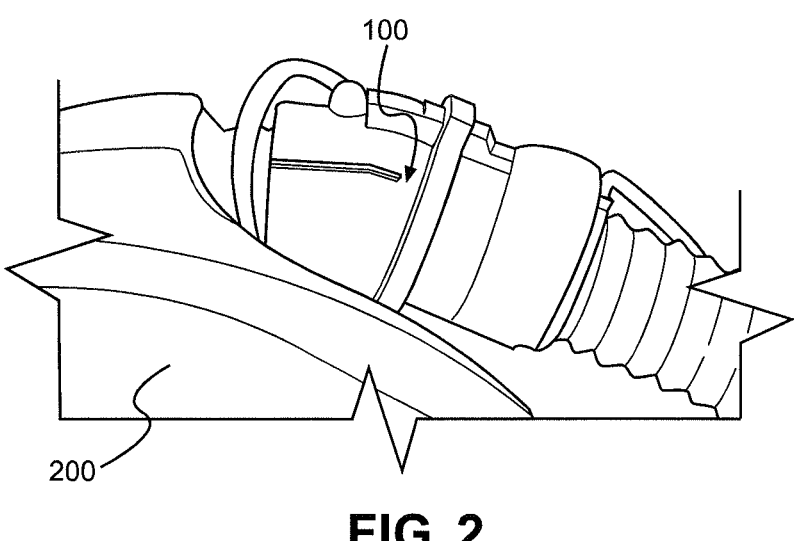
FIG. 2 is a photograph of the side view of the Quick Release Assembly in its top-mounting hose embodiment attached to a standard race helmet and a standard air and electrical communications hose with a hose/helmet attached.

FIG. 2 is a photograph of the side view of the Quick Release Assembly 100 in its top-mounting embodiment to helmet 200. In this embodiment, Quick Release Assembly 100 attaches to the upper surface of the helmet and the air and electrical communication interface is accomplished in the same manner as shown in FIG. 1.

Figures 3, 4:
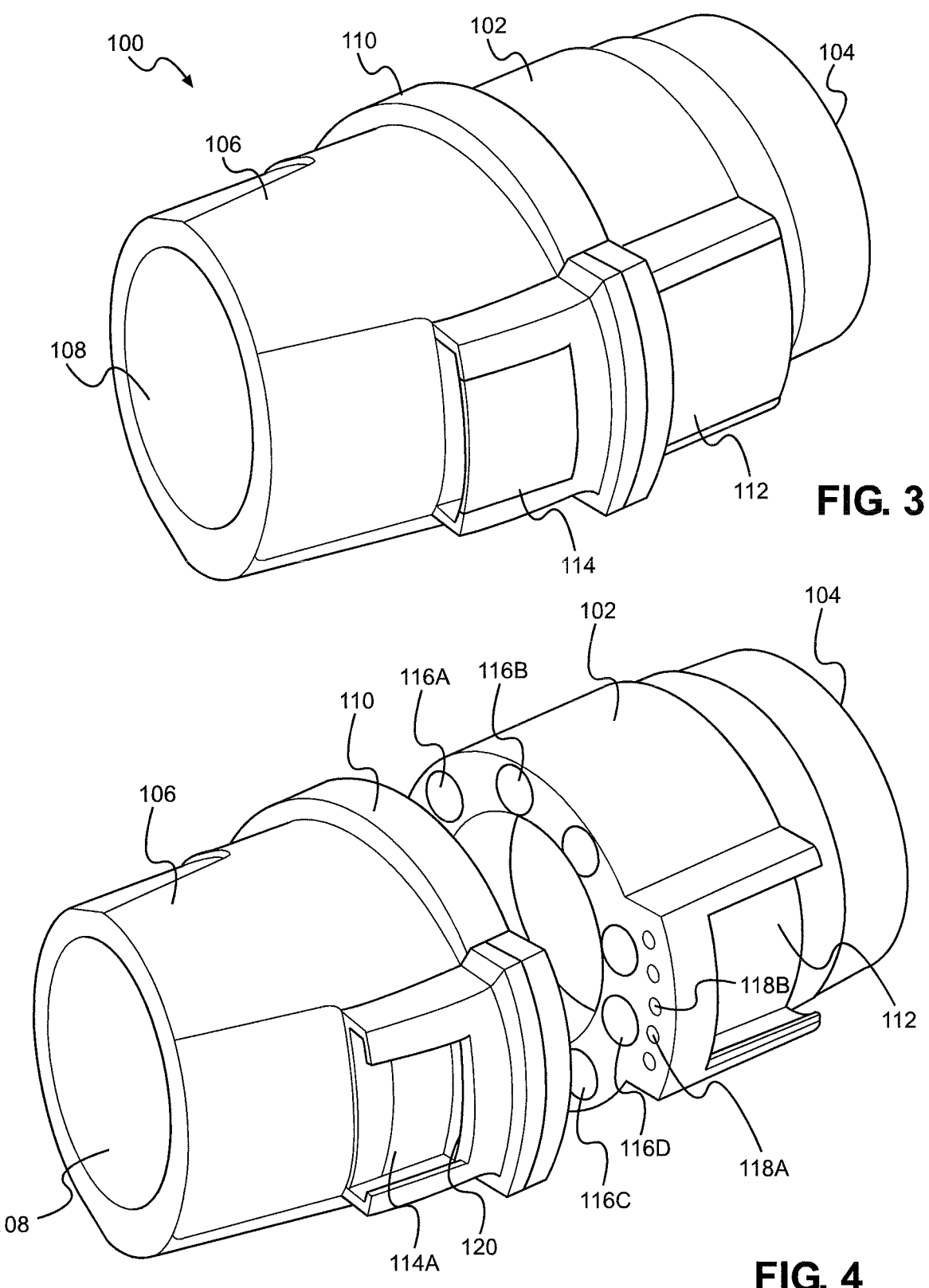
FIG. 3 is side perspective view of the Quick Release Assembly of the present invention in which the helmet half of the assembly and the vehicle half of the assembly are connected to form the magnetically aligned interface and showing the channel for electrical reception and the air outlet of the helmet half of the assembly without a hose/helmet attached.
FIG. 4 is a side perspective view of the Quick Release Assembly of FIG. 4 in which the helmet half of the assembly and the vehicle half of the assembly are disconnected to show the magnetically aligned interface and the channel for electrical connection, the air outlet of the helmet half, and the magnets and channel cups of the vehicle half of the assembly without a hose/helmet attached.

Referring now to FIG. 3, a side perspective view of the Quick Release Assembly 100 of the present invention is shown in which the helmet half 106 of the assembly 100 and the vehicle half 102 of the assembly 100 are connected together to form the magnetically aligned interface. Electrical connections 112 and 114 are shown more clearly in this Figure and it is to be appreciated that when the helmet half 106 and the vehicle half 102 are adjacent, an electrical connection is established between them. Similarly, when halves 102 and 106 are connected, an air channel is formed between vehicle hose 204 inlet 104 on the vehicle half 102 and the helmet hose outlet 108 on the helmet half 106.

FIG. 4 is a side perspective view of the Quick Release Assembly 100 of FIG. 3 in which the helmet half 106 of the assembly 100 and the vehicle half 102 of the assembly 100 are disconnected and separated slightly to show the magnetically aligned interface and the channel for electrical connection. More specifically, from this view it can be appreciated that the vehicle half 102 is formed to have a circular array of magnetic elements 116 on its inner face. These magnetic elements, such as elements 116A, 116B, 116C, 116D, are positioned with designated polarity around the inner face. Also, vehicle half 102 is formed to have an array of electrical connections, such as 118A and 118B, that are positioned adjacent magnetic elements 116 and provide for the electrical connection to vehicle communication cable 208.

Also from this view, it can be appreciated that helmet half 106 is formed with a corresponding circular array of magnetic elements 122 (not shown in this Figure) on its inner face. Helmet half 106 also is formed to have an array of electrical connections, such as 120, that are positioned adjacent magnetic elements 122 and provide for the electrical connection to the helmet communication cable 206.

When helmet half 106 and vehicle half 102 are positioned adjacently, the magnetic elements 116 on the vehicle half 102, and the magnetic elements 122 on the helmet half 106, assert a mutual magnetic pull to urge the two halves together and securely hold them in place together. By selectively arranging the polarity of magnetic elements 116 and 122, the assembly 100 is designed to prevent misalignment between the two halves 102 and 106. Moreover, due to the self-orienting nature of the polarity of the magnetic elements, the two halves will self-orient as they pull the themselves together to establish a connection. This avoids misconnections or a poor connection between the halves and instead establishes a consistent and reliable connection.

Figures 5, 6:
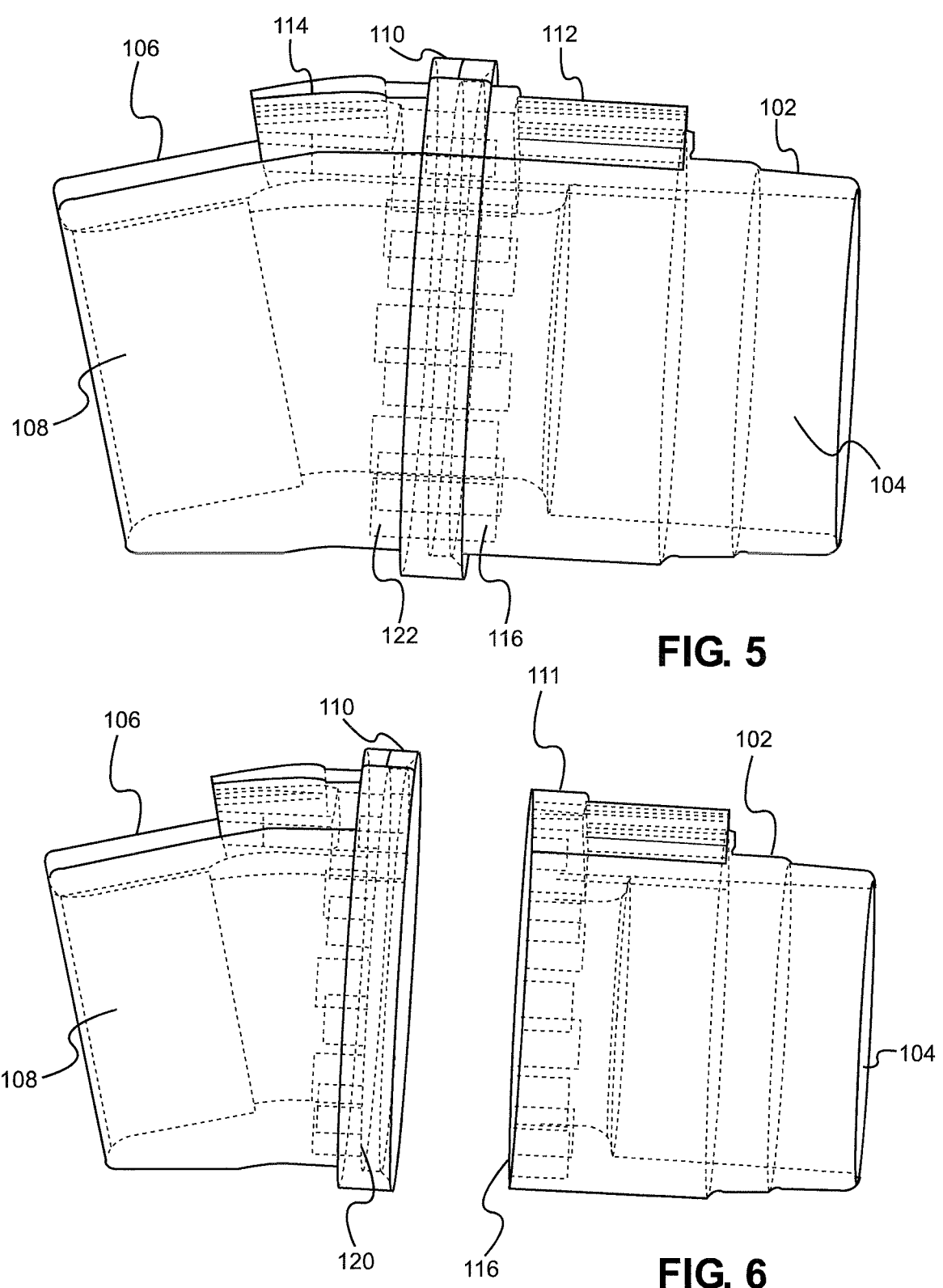
FIG. 5 is a side view of the Quick Release Assembly in which the helmet half of the assembly and the vehicle half of the assembly are connected to form the magnetically aligned interface and showing in hidden lines the various magnets, the air outlet of the helmet half, and the air inlet of the vehicle half of the assembly with no hose/helmet attached.
FIG. 6 is a side view of the Quick Release Assembly in which the helmet half of the assembly and the vehicle half of the assembly are disconnected to demonstrate the magnetically aligned interface and showing in hidden lines the various magnets, the air outlet of the helmet half, and the air inlet of the vehicle half of the assembly with no hose/helmet attached.

FIG. 5 is a side view of the Quick Release Assembly 100 in which the helmet half 106 of the assembly 100 and the vehicle half 102 of the assembly 100 are connected to form the magnetically aligned interface. More specifically, the various magnetic elements 116 and 122 are shown in hidden lines which depict the magnetic elements directly adjacent to each other when the vehicle half 102 and the helmet half 106 are positioned together. This close proximity, provides for a very strong magnetic attraction between the two halves ensuring a reliable connection. Similarly, the positioning of the two halves 102 and 106 adjacent to each other establishes a multi-conductor electrical connection between helmet half electrical conductors 120 and vehicle half electrical conductors 118. In a preferred embodiment, electrical conductors 118 may be conductive pins protruding from the face of the vehicle half 102 and electrical conductors 120 may be conductive sleeves within the face of the helmet half 106 to receive the pins to establish a connection therebetween. However, it is to be appreciated that any other reliable electrical connection known in the industry and capable of being easily and quickly connected and disconnected is fully contemplated herein.

Also shown in FIG. 5 is the air pathway that is formed between vehicle half inlet 104, and helmet half outlet 108. This air pathway is open, non-restrictive, and allows for the unobstructed passage of air through the Quick Release Assembly 100. The firm connection between magnetic elements 116 and 120 minimize the escape of the pressurized air flow, and the sealing ring 110 further seals the two halves 102 and 106 together.

FIG. 6 is a side view of the Quick Release Assembly 100 in which the helmet half 106 of the assembly 100 and the vehicle half 102 of the assembly 102 are disconnected to demonstrate the magnetically aligned interface and showing the various magnetic elements 116 and 120. From this view it can be easily appreciated that the two halves may be easily and repeatedly connected and disconnected simply by pulling the two halves apart with sufficient force to overcome the magnetic attraction between the magnetic elements 116 and 120. As the two halves 102 and 106 are separated, the helmet 200 becomes completely separate from the vehicle air hose 204 and communication cable 208 thus allowing the driver and passenger to rapidly exit and move away from the vehicle. This is particularly beneficial in circumstances in which there is an emergency, and the need to move quickly is paramount.

Figures 7, 8, 9:
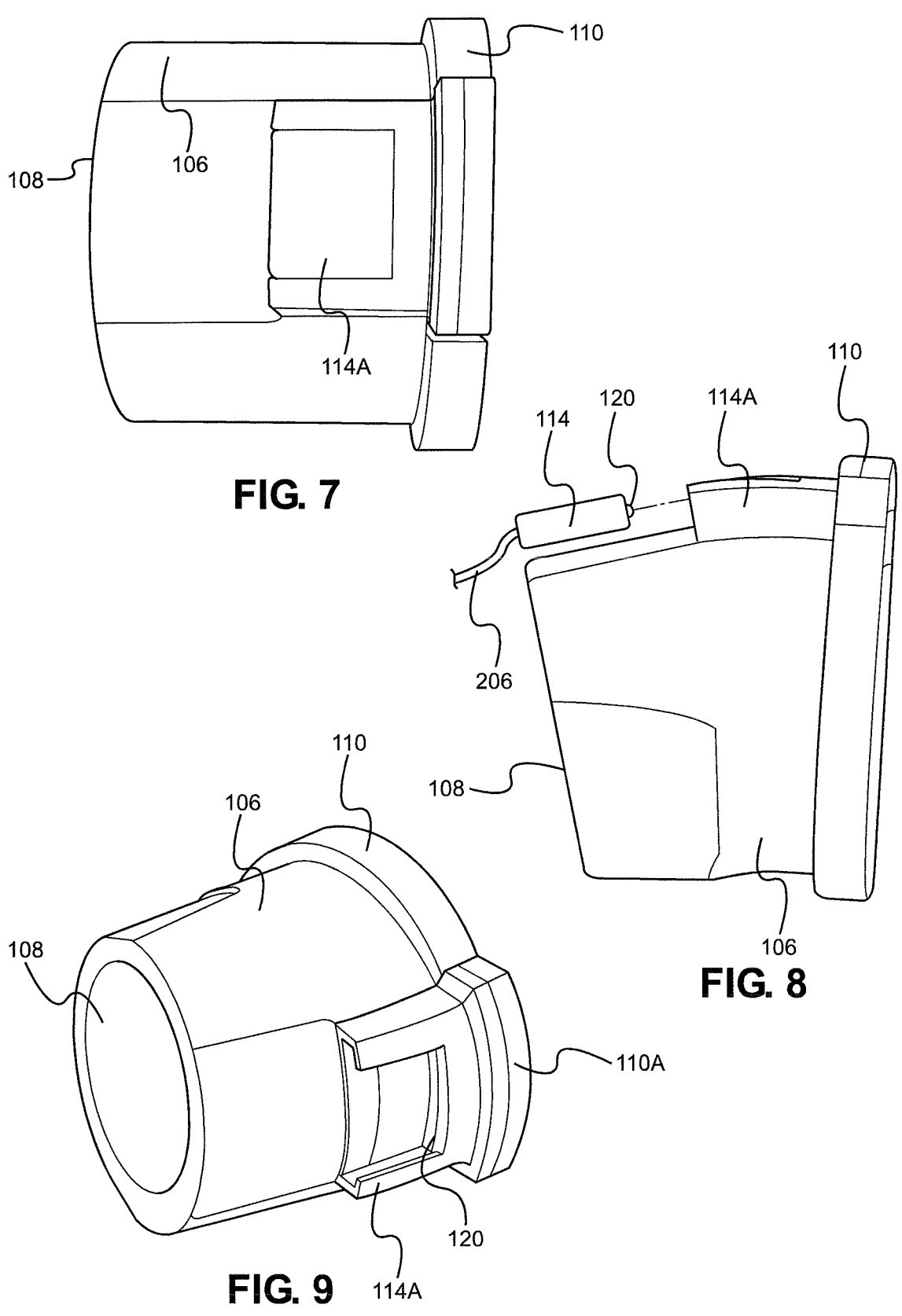
FIG. 7 is a top view of the helmet half of the Quick Release Assembly showing the channel for electrical reception, the air outlet of the helmet half, and the air inlet of the helmet half of the assembly.
FIG. 8 is a left side view of the helmet half of the Quick Release Assembly showing the channel for electrical reception, the air outlet of the helmet half, and the air inlet of the helmet half of the assembly.
FIG. 9 is a side perspective view of the helmet half of the Quick Release Assembly showing the channel for electrical reception, the air outlet of the helmet half, and the air inlet of the helmet half of the assembly.

FIGS. 7, 8 and 9 show the top, side and a perspective view of the helmet half 106 of the Quick Release Assembly 100. FIG. 7 shows the channel 114A for reception of the electrical connector 114. In use, the electrical connector 114 is placed into the channel 114A and left in place in the helmet half 106. Thus, when the Quick Release Assembly is separated, the helmet communication cable 206 is still connected to the helmet half 106. There is no need to plug, remove, and re-plug the electrical connections 120 together with the Quick Release Assembly 100. Once the electrical connector 114 is initially placed in channel 114A, it remains there for the life of the product.

FIG. 8 demonstrates the connection of the electrical connector 114 into channel 114A of helmet half 106 such that electrical conductors 120 are present at the interface between the helmet half 106 and the vehicle half 102. FIG. 9 also provides clear view of the sealing ring hood 110A that encircles the electrical connections 118 and 120 to avoid dust or debris from interfering with a reliable connection.

Figure 10:
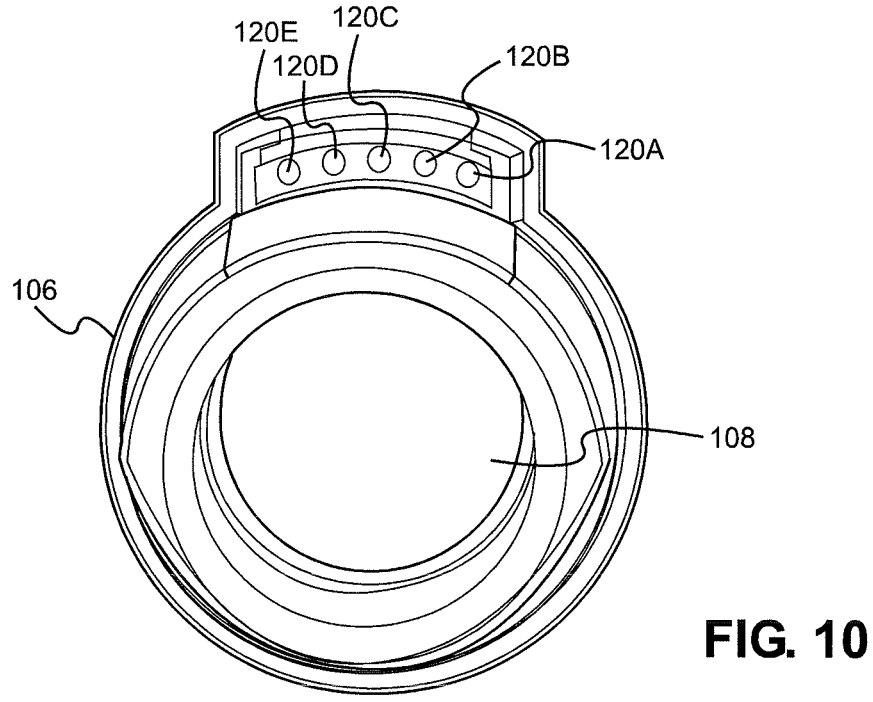
FIG. 10 is a back view of the helmet half of the Quick Release showing the channel for electrical reception (marked with dotted line), with the male connector push pins within the channel and the air inlet of the helmet half of the assembly without a helmet attached.
Figure 11:
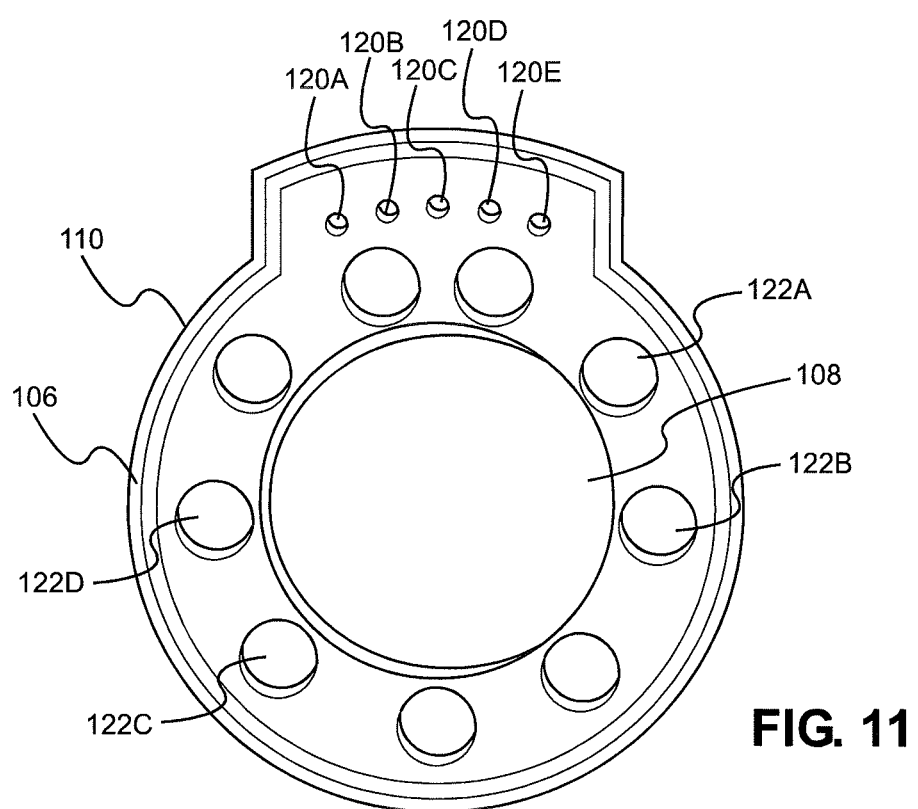
FIG. 11 is a front view of the air inlet of the helmet half of the Quick Release Assembly showing the channel for electrical reception (marked with a dotted line) in which the male connector pins can be seen, with the male connector push pins extending from the face to contact the corresponding connector cups on the vehicle half of the Quick Release Assembly.

FIGS. 10 and 11 are back and front view, respectively of the helmet half 106 and shows the placement of the magnetic elements 122 in a circular array around the face of the helmet half 106, as well as the position of the helmet half 106 electrical connections 120.

FIG. 12 is a plan view of the vehicle half 102 showing the placement of the various magnetic elements 116 in a circular array around the face of the vehicle half. From this view, and in comparison to FIG. 11, the positional correspondence between the magnetic elements 116 of the vehicle half 102 and the magnetic elements 122 of the helmet half 106 is clear. Each magnetic element 116 of the vehicle half 102 is positionally matched with a corresponding magnetic element 122 of the helmet half 106. The polarity of the corresponding magnetic elements is configured such that the poles are opposite such that when the two halves 102 and 106 are positioned adjacently, the magnetic attraction is sufficient to draw the two halves together firmly and securely. Also, because the polarity of adjacent magnetic elements 116 or 122 can vary, there is little chance that the two halves will pull together in misalignment.

Referring to FIG. 13, the vehicle half 102 is shown and shows the channel 112A for reception of the electrical connector 112. In use, the electrical connector 112 is placed into the channel 112A and left in place in the vehicle half 102. Thus, when the Quick Release Assembly is separated, the vehicle communication cable 208 is still connected to the vehicle half 102. There is no need to plug, remove, and re-plug the electrical connections 118 together with the Quick Release Assembly 100. Once the electrical connector 112 is initially placed in channel 112A, it remains there for the life of the product.

FIG. 14 is an illustration of the rear of the helmet 200 showing the face of the helmet half 106 of the Quick Release Assembly 100 in its top-mounting hose embodiment attached to a standard race helmet 200 and clearly showing the circular array of magnetic elements 122 intended to align and connect with the corresponding magnetic elements 116 of the helmet half 102.

FIG. 15 is a top view of the helmet half 106 of the Quick Release Assembly 100 in its top-mounting hose embodiment of FIG. 14, showing the attachment to the helmet air inlet tube 202 and helmet communication cable 206.

FIG. 16 is a side view of the vehicle half 102 of the Quick Release Assembly 100 attached to a standard air hose 204 and electrical communications cable 208.

When considering FIGS. 14, 15 and 16 together, it can be easily appreciated that the connection and disconnection of the vehicle half 102 to the helmet half 106 of assembly 100 is simple and fast. For instance, when a driver or passenger enters a vehicle wearing a helmet 200 equipped with the Quick Release Assembly 100 of the present invention, they only need to grasp and position the vehicle half 102 near the helmet half 106, and the magnetic elements will automatically align the two halves according to the magnetic element polarity, and then instantly draw the two halves together to establish both a substantially air tight seal for the passage of clear air to the helmet, and a clean and reliable electrical connection between the helmet and vehicle communication systems.

Similarly, when there is a need to separate the two halves 102 and 106 of the Quick Release Assembly 100 in order to exit the vehicle, the two halves are simply pulled apart with sufficient force to overcome the natural magnetic attraction between the magnetic elements 116 and 120. This disconnects the driver or passenger from both the air supply and communication cable in one simple motion. This speed and ease of disconnection is particularly advantageous in circumstances where a rapid exit is essential—such as when there is an emergency (crash, fire, submersion, etc.), and failure to exit the vehicle immediately can result severe injury or death.

Referring now to FIG. 17, another preferred embodiment of the Quick Release Assembly is shown and generally designated 300. In the closed configuration, the helmet half 306 of the assembly 300 and the vehicle half 302 of the assembly 300 are connected together to form the magnetically aligned interface. Electrical connections 312 and 314 are illustrated, and it is to be appreciated that when the helmet half 306 and the vehicle half 302 are adjacent, an electrical connection is established between them. Similarly, when halves 302 and 306 are connected, an air channel is formed between vehicle hose 204 (shown in FIG. 1) inlet 304 on the vehicle half 302 and the helmet hose outlet 308 on the helmet half 306. Threaded apertures 309 on the helmet half 306 allow for the helmet half 306 to be attached more securely to helmet air inlet 202 (shown in FIG. 1).

It will be apparent to one of ordinary skill in the art that Quick Release Assembly 300 functions in a manner similar to Quick Release Assembly 100 illustrated in detail in FIGS. 3-13, and that the embodiments share many similar structural features. Additional embodiments including the various combinations of features between Quick Release Assembly 100 and Quick Release Assembly 300 are fully contemplated.

FIG. 18 is a side view of Quick Release Assembly 300, and FIG. 19 is a top-down view of Quick Release Assembly 300, both illustrating in greater detail the layout and appearance of the various components when Quick Release Assembly 300 is in its closed configuration.

FIG. 20 is a side perspective view of the Quick Release Assembly 300 of FIG. 4 in which the helmet half 306 of the assembly 300 and the vehicle half 302 of the assembly 300 are disconnected and separated slightly to show the magnetically aligned interface and the channel for electrical connection. More specifically, from this view it can be appreciated that the vehicle half 302 is formed to have a circular array of magnetic elements 316 on its inner face. These magnetic elements, such as elements 316A, 316B, 316C, 316D, are positioned with designated polarity around the inner face. Above the magnetic elements 316 is an array of electrical connections, such as 318A, 318B, 318C, 318D, and 318E that provide for the electrical connection to vehicle communication cable 208 (shown in FIG. 1).

The top plates of electrical connectors 312 and 314 are raised to show the channels 312A and 314A for reception of cables to provide signals to electrical connections, such as 318A through 318D and corresponding connections on helmet side 306. As discussed in connection with assembly 100 (see FIGS. 7 and 13), after the cables are attached to electrical connectors 312 and 314 there is no need to plug, remove, and re-plug the electrical connections together with the Quick Release Assembly 300.

Also from this view, it can be appreciated that helmet half 306 is formed with a corresponding circular array of magnetic elements on its inner face. Helmet half 306 also is formed to have an array of electrical connections, similar to those illustrated as 120A-120E in FIG. 11, that are positioned adjacent magnetic elements, similar to those illustrated as 122A-D in FIG. 11, and provide for the electrical connection to the helmet communication cable 206 (shown in FIG. 1). Additional embodiments including a single ring or washer-shaped magnet on each of helmet half 306 and vehicle half 302 are contemplated. The ring or washer-shaped magnets take the place of the circular arrays of magnets in both function and location on both helmet side 306 and vehicle side 302.

Referring now to FIG. 21, a cutaway view of Quick Release Assembly 300 better illustrates the location of channels 312A and 314A with assembly 300 in its closed configuration. The effective combination of inlet 304 and outlet 308 into a single pathway for air can also be appreciated by the cutaway view. This air pathway is open, non-restrictive, and allows for the unobstructed passage of air through the Quick Release Assembly 300. The firm connection between magnetic elements of helmet side 306 and vehicle side 302 minimize the escape of the pressurized air flow, and the sealing ring, made up of structures 310A and 310B, further seals the two halves 302 and 306 together.

Referring now to FIG. 22, an alternative embodiment of a Quick Release Assembly is illustrated and generally designated 400. Assembly 400 is substantially similar to assembly 300 illustrated in FIGS. 17-21, but has a ring magnet 416 on vehicle half 402, and a corresponding ring magnet (not shown), substantially similar in appearance, on helmet half 406 and configured to magnetically engage ring magnet 416 to retain assembly 400 in the closed configuration.

While there have been shown what are presently considered to be preferred embodiments of the present invention, it will be apparent to those skilled in the art that various changes and modifications can be made herein without departing from the scope and spirit of the invention.

What is claimed is:

1. A quick-release safety assembly, comprising:
a connector, comprising:

a helmet-side part having an air outlet and a circular array of magnets; and a vehicle-side part having an air inlet and a circular array of magnets, wherein the circular array of magnets of the vehicle-side part corresponds with the circular array of magnets of the helmet-side part to establish a self-orienting connection, thereby securing the hose-side connector to the helmet-side connector such that air passes through the connector, wherein the connector further comprises a sealing ring, wherein the helmet-side part and the vehicle-side part connect at the sealing ring, wherein the sealing ring ensures a substantially air-tight seal for passage of clean air through the connector, wherein the helmet-side part further comprises an array of electrical connectors, and the vehicle-side part further comprises a corresponding array of electrical connectors, and wherein the self-orienting connection ensures alignment of the electrical connectors such that electrical communications are passed through the connector, and wherein the connector further comprises a sealing ring hood located on the sealing ring, the sealing ring hood configured to encircle the array of electrical connectors on the helmet-side part and the array of electrical connectors on the vehicle-side part such that dust and debris is prevented from interfering with a reliable electrical connection.

2. The quick-release safety assembly of claim 1, wherein the helmet-side part further comprises a channel configured to receive an electrical connector of a helmet communication cable such that the electrical connector is placed in electrical communication with the array of electrical connectors on the helmet-side part.

3. The quick-release safety assembly of claim 2, wherein the vehicle-side part further comprises a channel configured to receive an electrical connector of a vehicle communication cable such that the electrical cable of the vehicle communication cable is placed in electrical communication with the array of electrical connectors on the vehicle-side part.

4. A quick-release safety assembly system, comprising:
a helmet having an air inlet and a communication plug;
an air hose connected to a breathable air supply;
a vehicle communication system having a communication plug; and
a connector, comprising a helmet-side part having an air outlet, a circular array of magnets, and an array of electrical connections; and a vehicle-side part having an air inlet, a circular array of magnets, and an array of electrical connections, wherein the helmet-side part is connected to the air inlet of the helmet and the communication plug of the helmet, wherein the vehicle-side part is connected to the air hose and the communication plug of the vehicle communication system, wherein the circular array of magnets of the vehicle-side part corresponds with the circular array of magnets of the helmet-side part to establish a self-orienting connection, thereby securing the hose-side connector to the helmet-side connector such that air passes through the connector, wherein the self-orienting connection further aligns the array of electrical connections of the helmet-side part with the array of electrical connections of the vehicle-side part, such that the communication plug of the helmet is placed in electrical communication with the communication plug of the vehicle communication system, wherein the helmet-side part and the vehicle-side part connect at the sealing ring, wherein the sealing ring ensures a substantially air-tight seal for passage of clean air from the air hose to the air inlet of the helmet, and wherein the connector further comprises a sealing ring hood located on the sealing ring, the sealing ring hood configured to encircle the array of electrical connectors on the helmet-side part and the array of electrical connectors on the vehicle-side part such that dust and debris is prevented from interfering with a reliable electrical connection.

5. The quick-release safety assembly system of claim 4, wherein the sealing ring is located on the helmet-side part.

* * * * *